United States Patent [19]

Nordgren et al.

[11] 4,430,804

[45] Feb. 14, 1984

[54] DEVICE FOR SETTING INCLINATION

[76] Inventors: Bo Nordgren, Vikingavägen 57, 183 43 Täby; Ivar Johansson, Södra Stationsgatar, 7 940 20 Öjebyn, both of Sweden

[21] Appl. No.: 328,546

[22] PCT Filed: Mar. 25, 1981

[86] PCT No.: PCT/SE81/00095

§ 371 Date: Nov. 24, 1981

§ 102(e) Date: Nov. 24, 1981

[30] Foreign Application Priority Data

Mar. 26, 1980 [SE] Sweden .............................. 8002352

[51] Int. Cl.[3] ............................................ G01C 9/12
[52] U.S. Cl. ........................................ 33/398; 33/295
[58] Field of Search ................ 33/1 N, 283, 295, 333, 33/354, 370, 391, 398, 399, 400

[56] References Cited

U.S. PATENT DOCUMENTS

| 352,276 | 11/1886 | St. Clair | 33/398 |
| 1,604,052 | 10/1926 | King, Sr. | 33/398 |
| 2,342,359 | 2/1944 | Mitchell | 33/398 |
| 2,544,438 | 3/1951 | Allgeo | 33/398 |
| 2,571,287 | 10/1951 | Peters | 33/354 |
| 2,907,246 | 10/1959 | Farrand et al. | 33/398 |
| 2,998,727 | 9/1961 | Baker | 33/398 |

FOREIGN PATENT DOCUMENTS 446735  3/1968  Switzerland .......................... 33/398

Primary Examiner—Richard R. Stearns
Attorney, Agent, or Firm—Dowell & Dowell

[57] ABSTRACT

A device for setting the inclination of a reference object such as a mirror or the like, used as a reference for lining up, levelling in, etc. The mirror (10) is rotatably balanced about an axle (12) and a portion thereof below said axle is provided with a moveable bob (14). A displacement of the bob causes the desired inclination of the mirror about the axle.

3 Claims, 2 Drawing Figures

DEVICE FOR SETTING INCLINATION

The present invention is concerned with a device for setting the inclination of a reference object such as a mirror or the like, e.g. for lining up, levelling etc.

For the purpose of simultaneously lining up and levelling in objects, such as pipes in a trench, it is a known practice to use leveling instruments equipped with a mirror, for example such as shown in Swedish Pat. application No. 7812008-6. The device shown therein comprises a cabinet, containing a mirror, which mirror is adjustable in a housing inside the cabinet by a setting means, the casing being in plumb at all times. The setting of the mirror with respect to the plumb line gives the level desired.

The present invention proceeds in another way for setting the reference object, such as a mirror, and is characterized as set forth in the accompanying claims.

Figure 1:
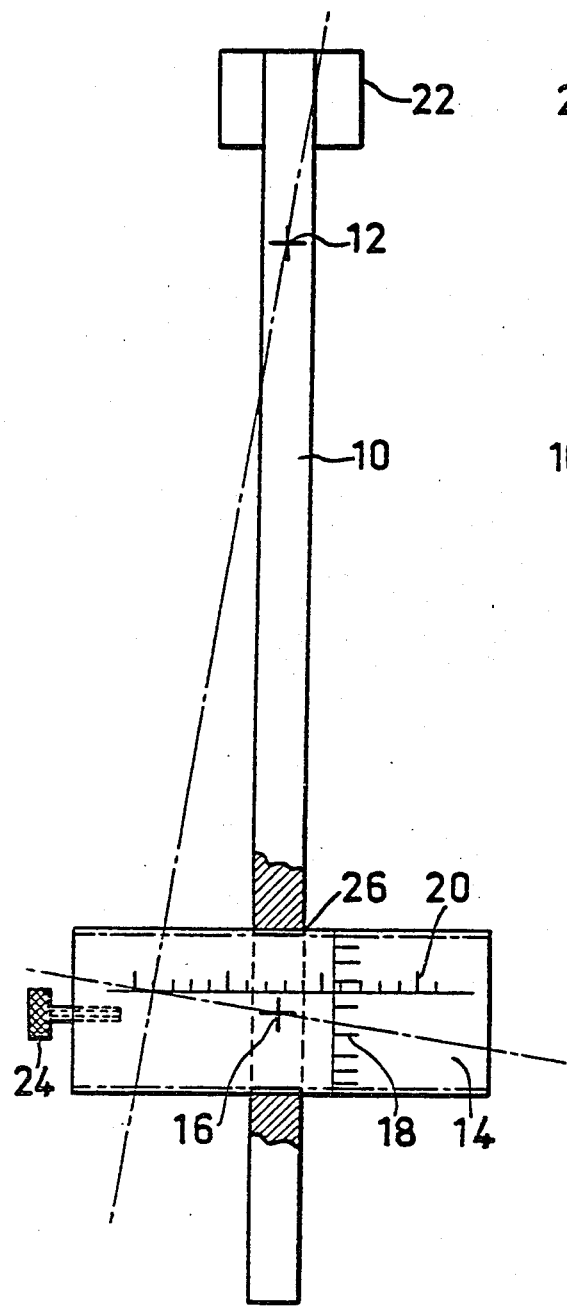
Figure 2:
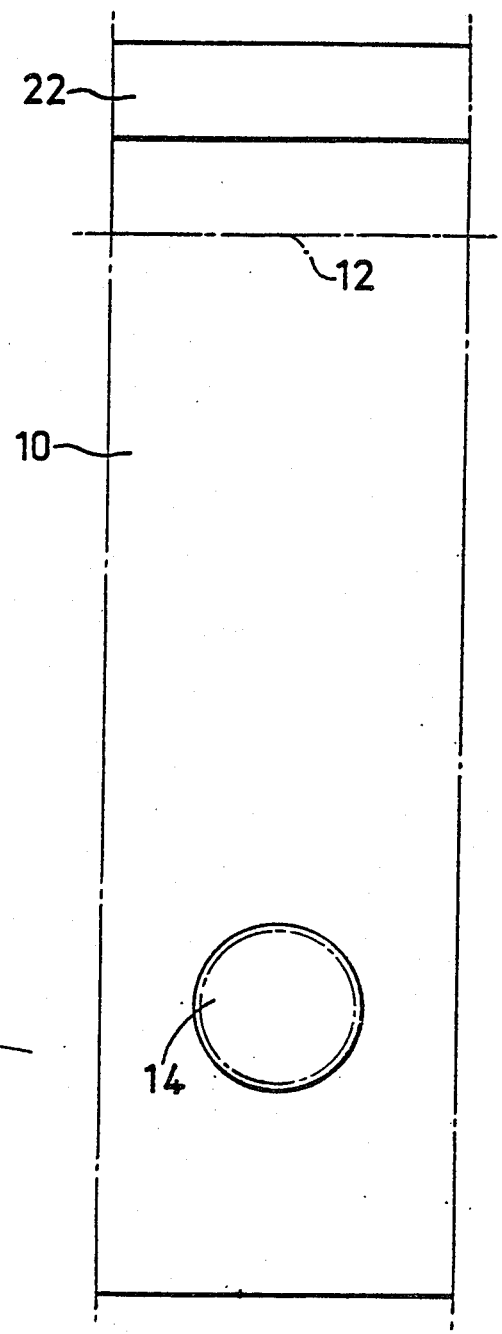

The invention will be further described hereafter with reference to the embodiment shown in the drawing. FIG. 1 shows a side elevation of an object with the setting device of the invention. FIG. 2 shows a front view.

The drawing shows a reference object, such as a mirror 10. It is to be understood that the invention is of general application for setting the inclination of reference objects and that a mirror such as described herein is only one example of the performance of the invention. The mirror 10 is balanced by means of counterweights 22 to rotate about a schematically indicated axle 12, which may be fitted with bearings in a known manner to reduce friction. A plumb bob 14 is positioned on a portion of the mirror 10 below the axle 12, the lower portion of the mirror 10 in the embodiment illustrated. The bob 14, which is of substantial weight in relation to the reference object, is mounted in the mirror 10 so as to be moveable and adjustable therein, being balanced about the plane of the mirror 10 when in the position indicated by unbroken lines. The bob 14 may, as mentioned, be moveably mounted in the mirror 10, but in the embodiment illustrated the bob 14 may also have the character of a micrometer screw which engages in screw threads 26 in a hole in the mirror 10 and can be screwed in either direction. The bob or micrometer screw 14 is provided with a suitable scale which can be read, for example, against a setting index on the mirror 10 and which directly shows the desired angle of inclination of the mirror.

In another embodiment the mirror is rigidly fixed to a frame which is rotatably suspended in the same manner as described above and balanced, together with the mirror, about the axle. In this case the bob is moveably mounted in the frame.

It will be apparent from the above that a displacement of the bob 14 in either direction about the mid plane of the mirror 10 will cause a change in the balance of the mirror 10, thus tilting the mirror. Thus if the bob 14 is displaced to the right in the figure the mirror will tilt to the position indicated in the figure by dashed lines, as the centre of gravity 16 of the bob will remain the same as before. By a suitable choice of scales 18, 20 on the bob 14 the inclination of the mirror can be set and/or read directly.

The calibrating screw 24 permits fine adjustment of the centre of gravity of the bob to a position directly below the axle.

The mirror 10 is preferably suspended with its axle 12 in a mirror housing (not illustrated) and the bearing and inclination desired are obtained by turning the mirror housing, e.g. manually, into the line of sight. Lining-up and levelling-in are then carried out by finding the line of sight by eye or using a sighting device such as a target rod or similar in the manner described in the above-mentioned Pat. application No. 7812008-6.

We claim:

1. An apparatus for aligning and leveling objects comprising a reference member having upper and lower ends and front and rear surfaces, means for pivotally mounting said reference member about an axis which extends generally parallel to said front and rear surfaces thereof at a point adjacent said upper end of said reference member, a first weight means mounted adjacent said upper end of said reference member and above said axis, a second weight means mounted to said reference member between said axis and said lower end of said reference member, said second weight means being transversely adjustable with respect to said reference member and being extendable beyond said front and rear surfaces thereof, said second weight means having an elongated axis and first and second ends disposed generally perpendicularly to said axis, a weight adjustment means mounted to one of said ends of said second weight means, said weight adjustment means being adjustable with respect to said one end of said second weight means whereby the center of gravity of said second weight means may be adjusted along said axis thereof.

2. The apparatus of claim 1 in which said reference member is a mirror and in which said second weight means is generally cylindrical and is threadingly engaged with said mirror.

3. The invention of claim 1 in which said second weight means further includes scale means for use in indicating the angle of inclination of said reference member with respect to the vertical direction.

* * * * *